US006437849B1

(12) United States Patent
DeClerck et al.

(10) Patent No.: US 6,437,849 B1
(45) Date of Patent: Aug. 20, 2002

(54) METHOD AND APPARATUS FOR PRINTING ON A PHOTOSENSITIVE MATERIAL USING A LIQUID CRYSTAL DISPLAY

(75) Inventors: Thomas G. DeClerck, Livonia; Curtis E. DeWolff, Fairport, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/540,075

(22) Filed: Mar. 31, 2000

Related U.S. Application Data

(63) Continuation of application No. 08/794,314, filed on Feb. 3, 1997, now Pat. No. 6,130,740.

(51) Int. Cl.[7] ........................ G03B 27/00; G03B 27/52; G03B 27/72
(52) U.S. Cl. ............................... 355/18; 355/71; 355/40
(58) Field of Search ............................... 355/18, 32, 38, 355/40, 71; 347/135; 358/302; 430/21

(56) References Cited

U.S. PATENT DOCUMENTS

| 3,649,121 A | | 3/1972 | Cohen | |
|---|---|---|---|---|
| 4,236,223 A | | 11/1980 | Stanly et al. | |
| 4,586,085 A | | 4/1986 | Haendle | |
| 5,099,277 A | | 3/1992 | Lucht et al. | |
| 5,140,428 A | | 8/1992 | Park | |
| 5,274,418 A | | 12/1993 | Kazami et al. | |
| 5,512,396 A | | 4/1996 | Hicks | |
| 5,652,661 A | * | 7/1997 | Gallipeau et al. | 358/302 |
| 5,739,897 A | * | 4/1998 | Frick et al. | 355/40 |
| 5,757,471 A | * | 5/1998 | Itoh et al. | 355/71 |
| 5,801,814 A | * | 9/1998 | Matsumoto | 355/40 |

* cited by examiner

Primary Examiner—Russell Adams
Assistant Examiner—Peter B. Kim
(74) Attorney, Agent, or Firm—David A. Novais

(57) ABSTRACT

A method and apparatus for printing an image onto a photosensitive media. The apparatus comprises a light source for producing an exposure light and an imaging active matrix liquid crystal display for providing images. The exposure light passing through the liquid crystal display for printing the images on the liquid crystal display onto the media. The liquid display is moved between a first position and a second position. A zoom lens is provided for adjusting the size of the image area on the photosensitive material so that substantially the entire width of the photosensitive material is filled.

10 Claims, 8 Drawing Sheets

METHOD AND APPARATUS FOR PRINTING ON A PHOTOSENSITIVE MATERIAL USING A LIQUID CRYSTAL DISPLAY

CROSS-REFERENCE TO RELATED APPLICATIONS

This is a continuation of application Ser. No. 08/794,314 filed Feb. 3, 1997 now U.S. Pat. No. 6,130,740.

FIELD OF THE INVENTION

The present invention relates to photographic printers which utilize a liquid crystal display for printing an image obtained from digital data.

BACKGROUND OF THE INVENTION

It is known, for example, from U.S. Pat. Nos. 4,935,820 and 5,050,001 to utilize a single liquid crystal display (LCD) to produce a color image on a photographic material. The LCD uses digital information obtained from scanning the negative or from any other source.

In a typical wholesale photofinishing lab, it is often desirable to generate bonus prints along with the standard service prints. Bonus prints are identical to the service prints, however, they are generally smaller in size and are typically placed in a wallet or small frame. It is also desirable in wholesale photofinishing to provide greeting cards and/or text appended to the service print, in which case, special masks and additional lens are required. These special masks and additional lens increase the cost and complexity of the system and generally waste substantial amounts of paper due to the large mechanical masks. In addition, substantial change-over time may be required further reducing the productivity of the wholesale photofinishing lab.

The present invention discloses a method and apparatus which allows automatic and immediate change-over from providing typical service prints, to providing additional bonus prints, or greeting card-type prints, while maintaining desired tolerances and producing high quality prints without wasting paper. Additionally, the present method and apparatus does not require additional masks for generating of the additional print or text.

The present invention solves the foregoing problems by providing an active matrix liquid crystal display on a moveable mounting member, which allows movement of the LCD between a first and second position, thereby fully utilizing the width of the photosensitive material while also providing high resolution images.

SUMMARY OF THE INVENTION

In accordance with one aspect of the present invention there is provided an apparatus for printing images onto a web of photosensitive media. The apparatus comprising a light source for producing an exposure light and an imaging active matrix liquid crystal display for providing images and defining a printing gate. The exposure light passes through the liquid crystal display for printing the images on the media. The apparatus further includes means for moving the web of photosensitive media past said printing gate. Means are provided for positioning the liquid crystal display at a first position and at a second position. Magnification means are provided for defining a first imaging area of a first size for printing on said web of photosensitive media when the liquid crystal display is placed in the first position and for defining a second imaging area of a second size for printing on the photosensitive media when the liquid crystal display is placed in the second position.

In accordance with another aspect of the present invention, there is provided a photographic printer for printing images on a web of photosensitive media. The apparatus comprising a first printing system for optically exposing images on the web of photosensitive media and a second printing system for exposing images on the web of photosensitive media at selective locations adjacent images provided on the web of media by the first printing system. The second printing system comprises a liquid crystal display and has means for printing images of two different printing resolutions.

In accordance with yet another aspect of the present invention there is provided an apparatus for printing images onto a web of photosensitive media. The apparatus comprising a light source for producing an exposure light; an imaging active matrix liquid crystal display for providing images and defining a printing gate, the exposure light passing through the liquid crystal display for printing the images on the liquid crystal display onto the media; means for moving the web of photosensitive media past the printing gate; and means for printing images of two different printing resolutions while still filling substantially the entire width of the web.

In still another aspect of the present invention there is provided a method of printing images on a web of photosensitive media using an active liquid crystal display, the web of photosensitive media having a predetermined width, comprising the steps of:

a) exposing an image of a first aspect ratio and size on the web of photosensitive media using the liquid crystal display, the first size substantially filling the width of the web of photosensitive media; and b) rotating the liquid crystal display and exposing an image of a second size on the web, the second aspect ratio and size substantially filling the width of the web of photosensitive media.

In another aspect of the present invention there is provided a method of printing images on a web of photosensitive media using an active liquid crystal display, the web of photosensitive media having a predetermined width, comprising the steps of:

a) exposing an image of a first resolution on the web of photosensitive media using the liquid crystal display; and b) rotating the liquid crystal display and exposing an image of a second resolution on the web.

DETAILED DESCRIPTION OF THE INVENTION

Figure 1:
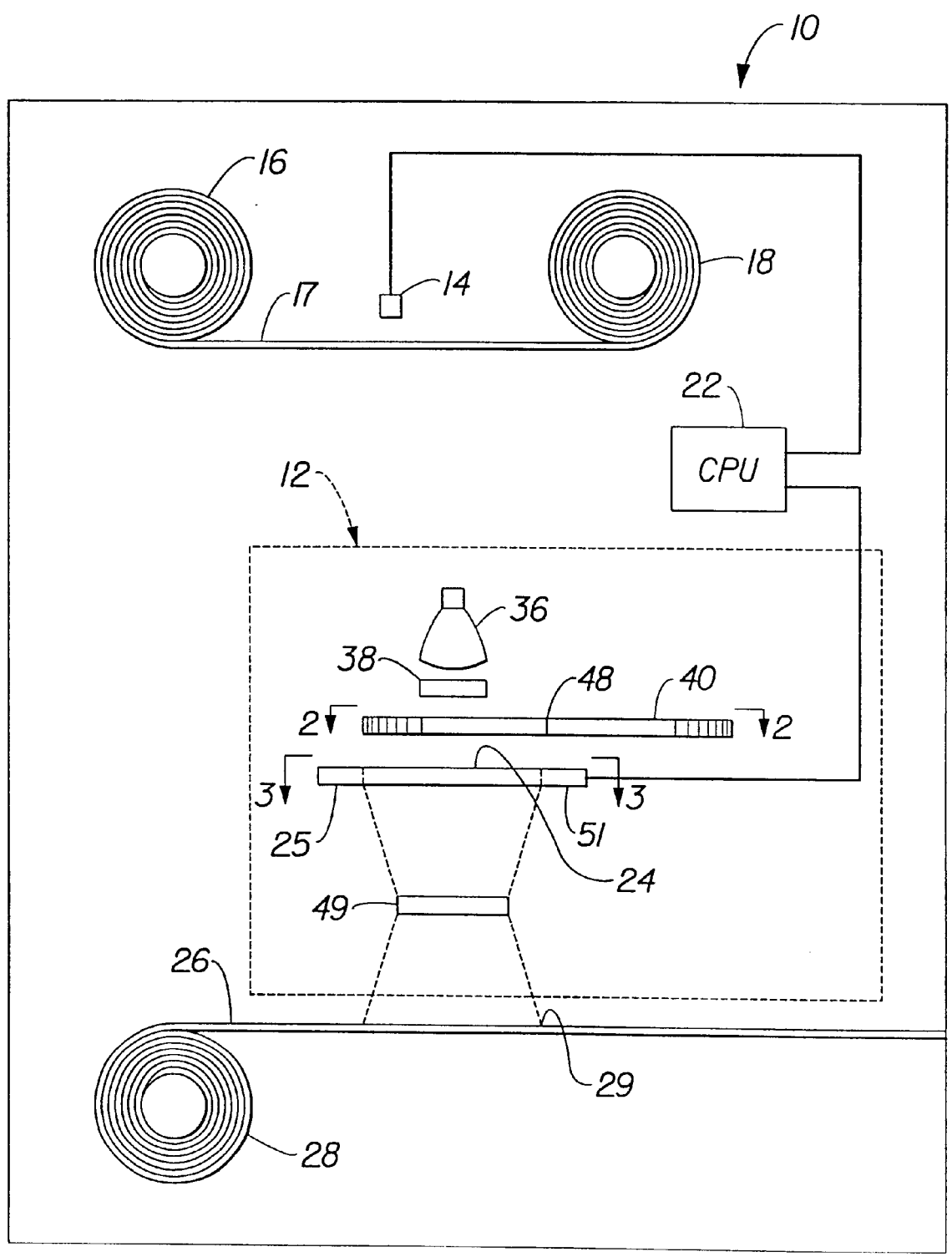
FIG. 1 is a diagrammatic representation of a printing apparatus made in accordance with the present invention.

Referring to FIG. 1, there is illustrated in schematic form a high speed photographic printing apparatus 10 made in accordance with the present invention. In particular, the high speed photographic printing apparatus 10 includes a digital printing system 12. The apparatus 10 further includes a supply reel 16 which comprises a plurality of strips of processed photographic film, each strip representing a single customer order which have been spliced together so as to form a long continuous web 17. A scanner 14 is provided for scanning of the web 17 as it passes thereby. In the particular embodiment illustrated, the scanner 14 comprises a CCD array (charged coupled device) which is used to obtain digital information representative of the images present on the web 17. The resolution of the scanner 14 is preferably equal to or greater than the resolution in the final printed image. The digital information obtained by scanner 14 is passed onto CPU (computer) 22. A take-up reel 18 is provided for taking up web 17 from reel 16. Appropriate mechanisms (not shown) are provided for moving web 17 from reel 16 to reel 18 as is well known in the art.

The digital printing system 12 includes an active matrix imaging liquid crystal display 24 (AMLCD) mounted to a movable member 25. The display 24 is used to provide images which can be exposed onto a photosensitive medium. As can be seen, the display 24 is generally rectangular in shape having a length LD and a width WD, LD being greater than WD. In the particular embodiment illustrated the display has an aspect ratio of about 6 to 4 and defines a longitudinal axis LD.

Figure 2:
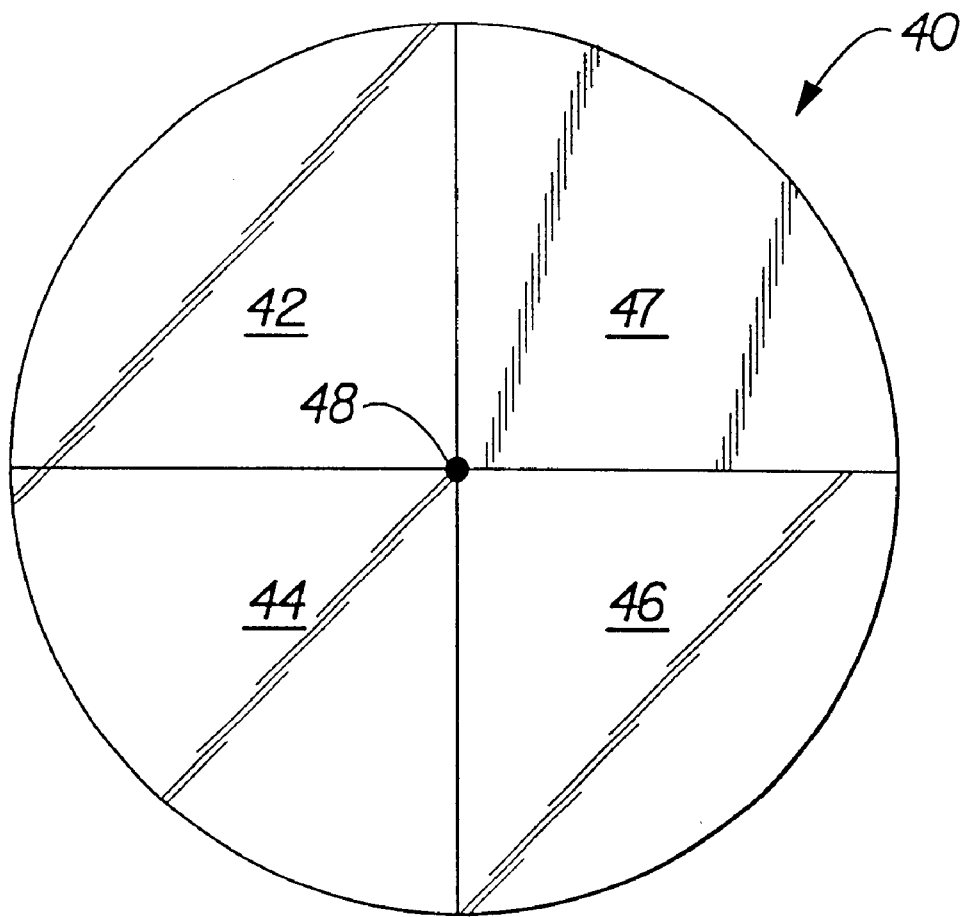
FIG. 2 is a top plan view of the filter wheel of FIG. 1 as taken along line 2—2.

In the particular embodiment illustrated, the photosensitive media comprises photographic paper 26 which is supplied by reel 28. Appropriate means are used for transporting the photographic paper 26 to the print gate 29 as is customarily done in prior-art type photographic printers. The active matrix imaging liquid crystal display 24 comprises a monochromatic display having preferably a minimum number of pixels of 800×600. A suitable AMLCD may be purchased from the Epson Corporation, Part No. P13SM015. In order to provide a high quality image, the minimal number and arrangement of the pixels of the AMLCD 24 should correspond to the number and arrangement of pixels in the CCD sensor 14. Preferably, this relationship is 1:1 or higher. The digital printing system 12 further includes a light source 36 for providing imaging light and an infrared cutoff filter 38 for eliminating undesirable portions of the light spectrum such that only substantially visible light is transmitted. A color filter wheel 40 is provided prior to the light reaching the active matrix liquid crystal display 24 and is used to color the image on the photosensitive paper 26. In particular, the filter wheel 40 (see FIG. 2) comprises filter sections 42,44,46 wherein filter section 42 is a blue pass filter, filter section 44 is a green pass filter, and section 46 is a red pass filter. By rotating filter wheel 40 about axis 48, the desired colored filter section may be placed between the light source 36 and the active matrix liquid crystal display 24 so as to generate a colored image onto the photographic paper. Wheel 40 is also provided with an opaque section 47 so as to block light from light source 36 from exposing paper 26 during non-exposure time of the digital printing process. A zoom lens 49 is provided for focusing of the image produced by AMLCD 24 onto the photographic paper 26. The central processing unit 22, which receives the digital information obtained by scanner 14, is also used to control the various components of the apparatus as is customarily done in the art, and also provides the appropriate digital data for producing of the images on the AMLCD 24.

In order to produce a single colored image on the photographic paper 26, it is necessary to rotate the filter wheel 40 and maintain the image on the AMLCD 24 for an appropriate period of time so that each of the filter sections are exposed for the appropriate length of time. Applicants have found that when using the digital printing system, full color images can be exposed on the photographic paper within about 0.25 seconds.

Figure 3A:
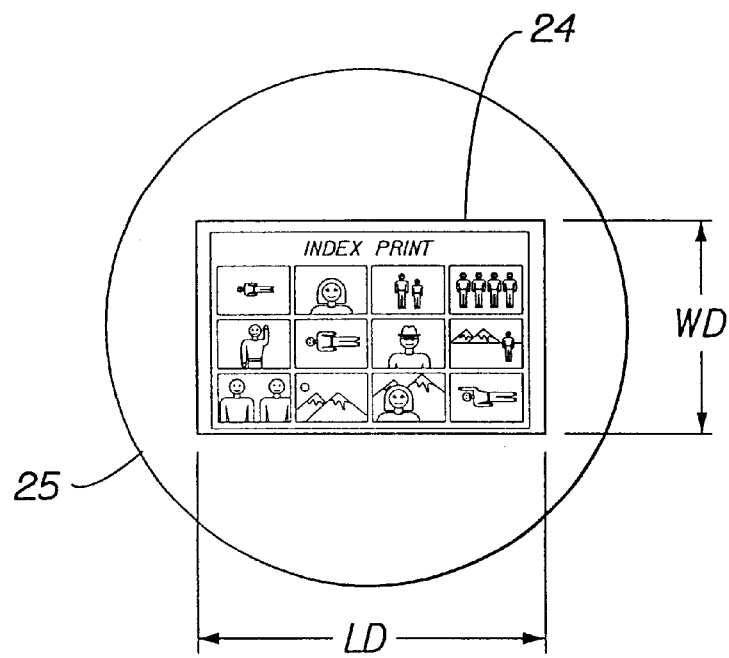
FIG. 3A is a top plan view of the AMLCD and mounting member of FIG. 1 as taken along line 3—3 illustrating the AMLCD in a first position.
Figure 4A:
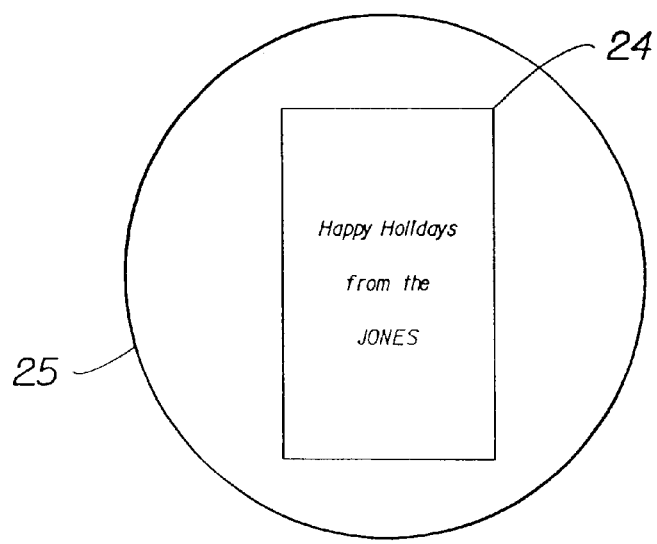
FIG. 4A is a top plan view of the AMLCD and mounting member of FIG. 1 as taken along line 3—3 illustrating the AMLCD in a second position
Figure 3B:
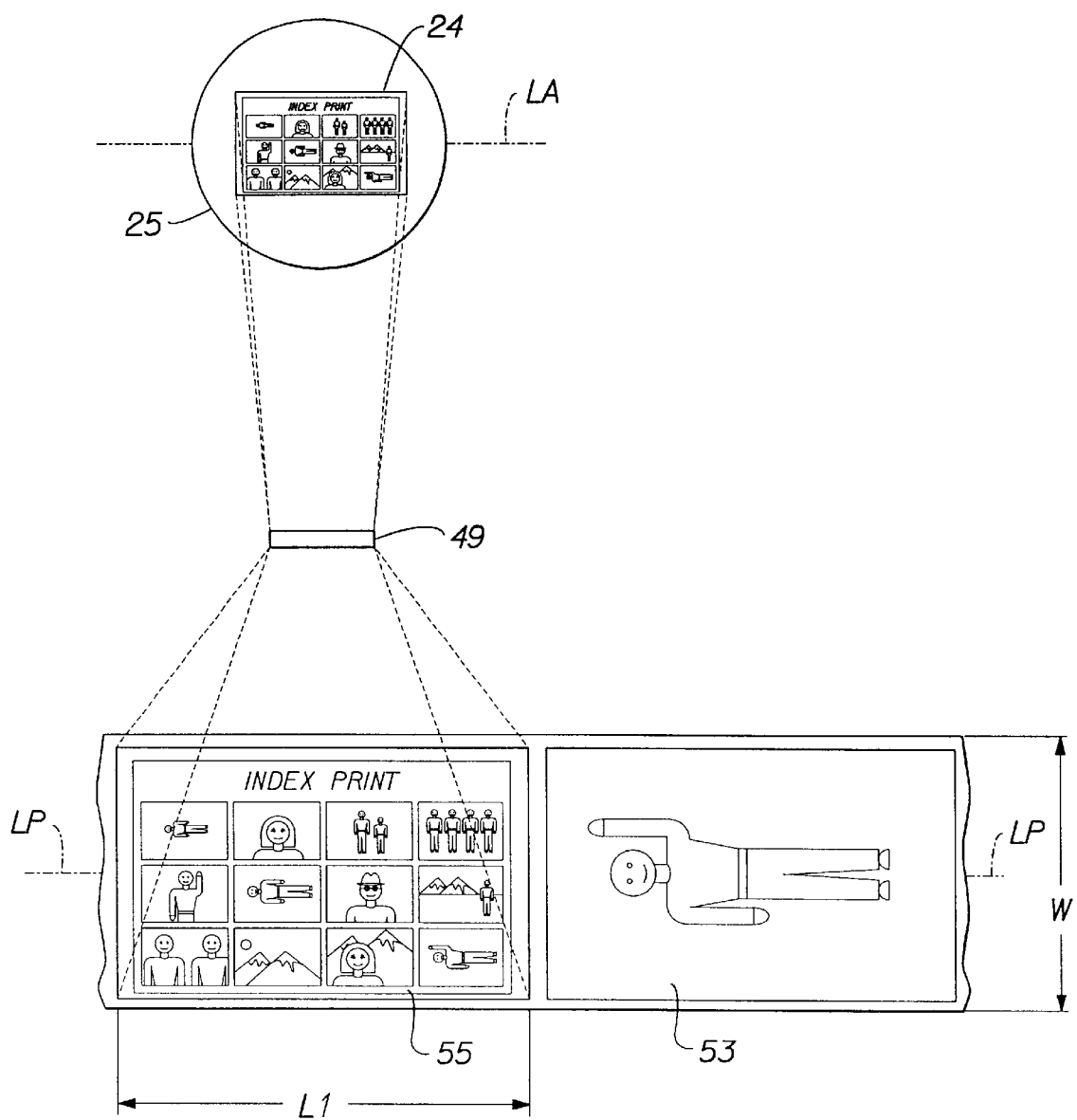
FIG. 3B is a schematic illustration of the AMLCD and mounting member of FIG. 3A and its relationship to the zoom lens, photosensitive material, and the images that have been exposed on the photosensitive material by the AMLCD.
Figure 4B:
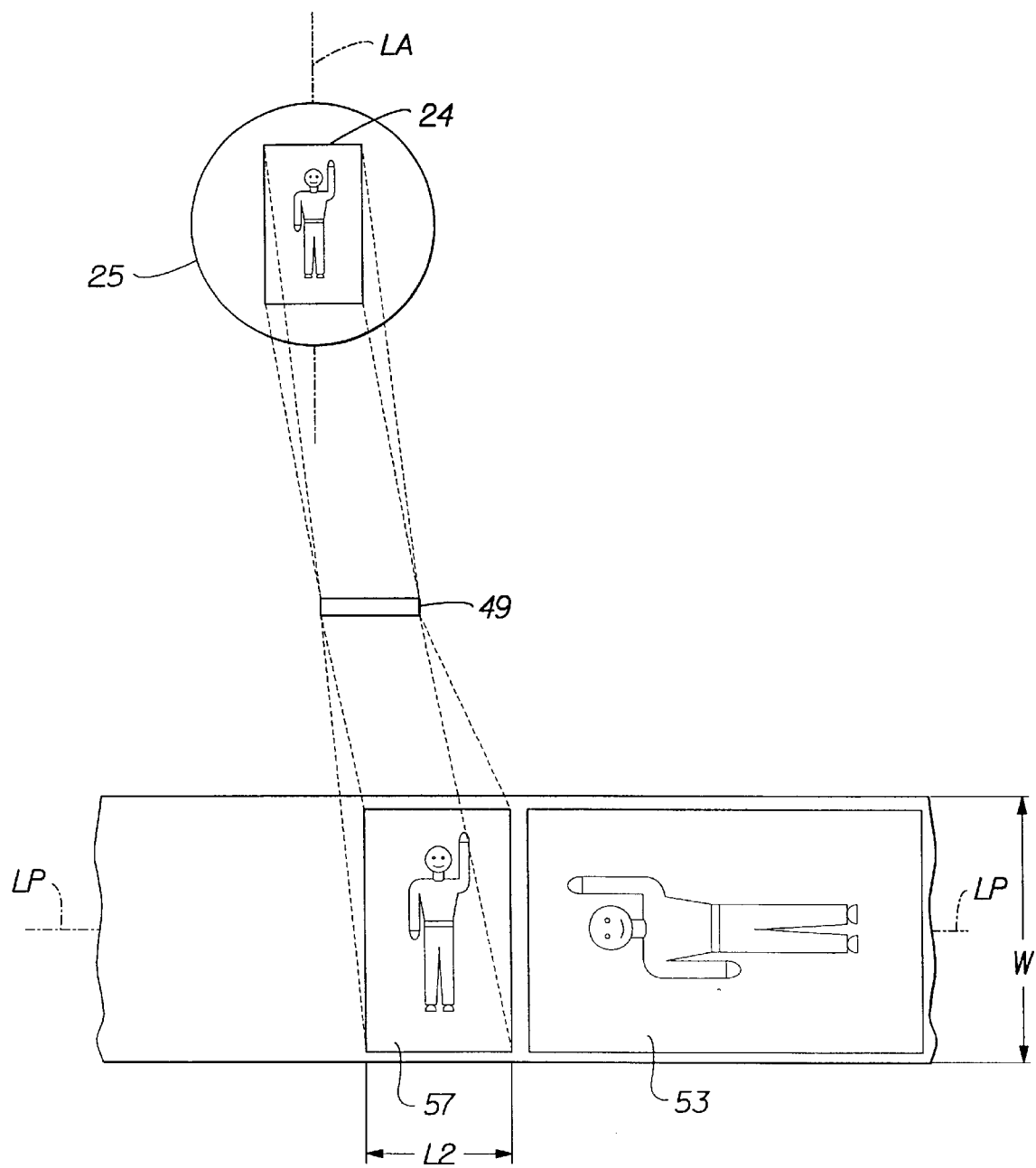
FIG. 4B is a schematic illustration of the AMLCD and mounting member of FIG. 4A and its relationship to the zoom lens, photosensitive material, and the images that have been exposed on the photosensitive material by the AMLCD.
Figure 4C:
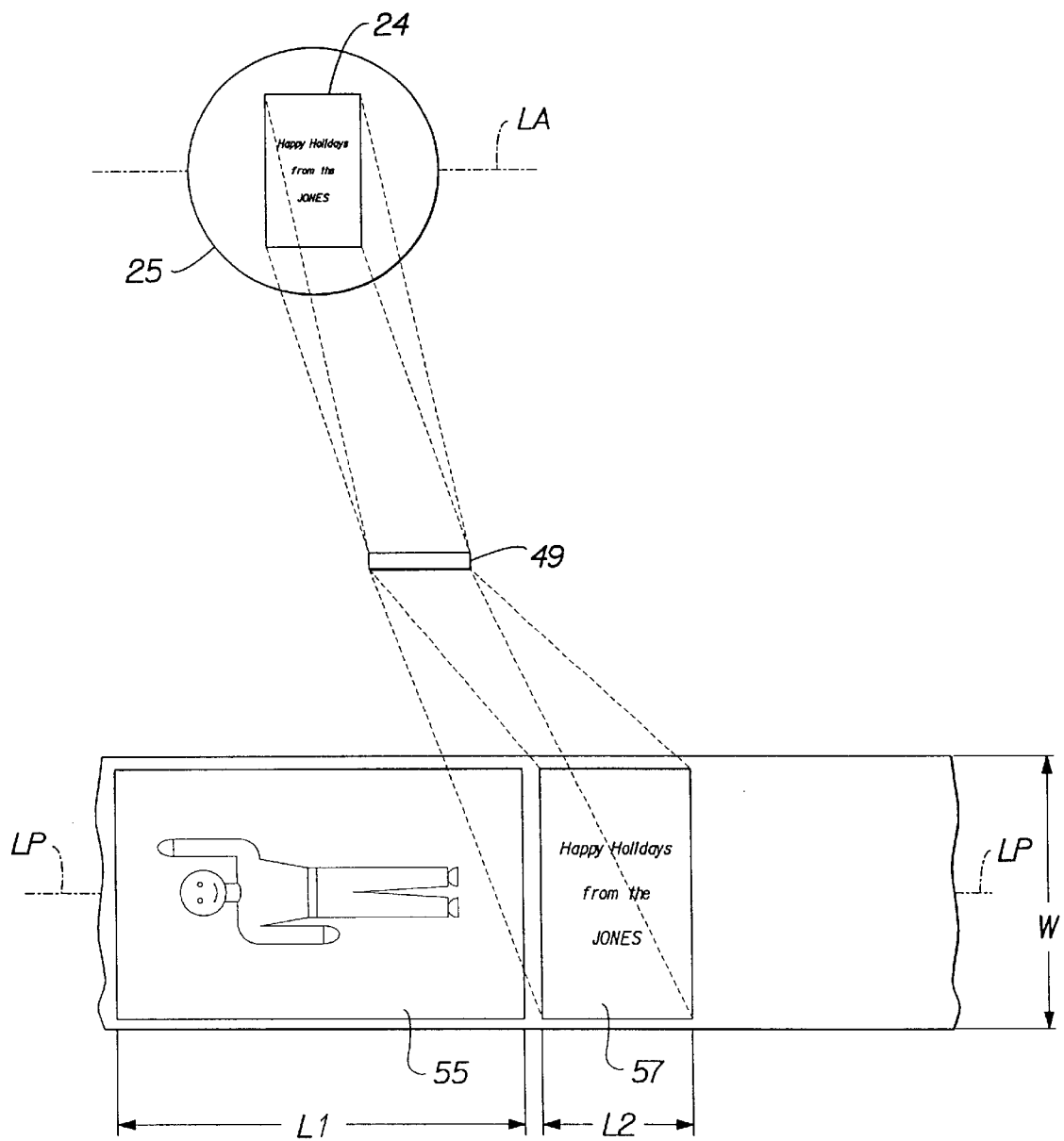
FIG. 4C is view similar to FIG. 4B illustrating different type images that may be exposed on the photosensitive material.
Figure 4D:
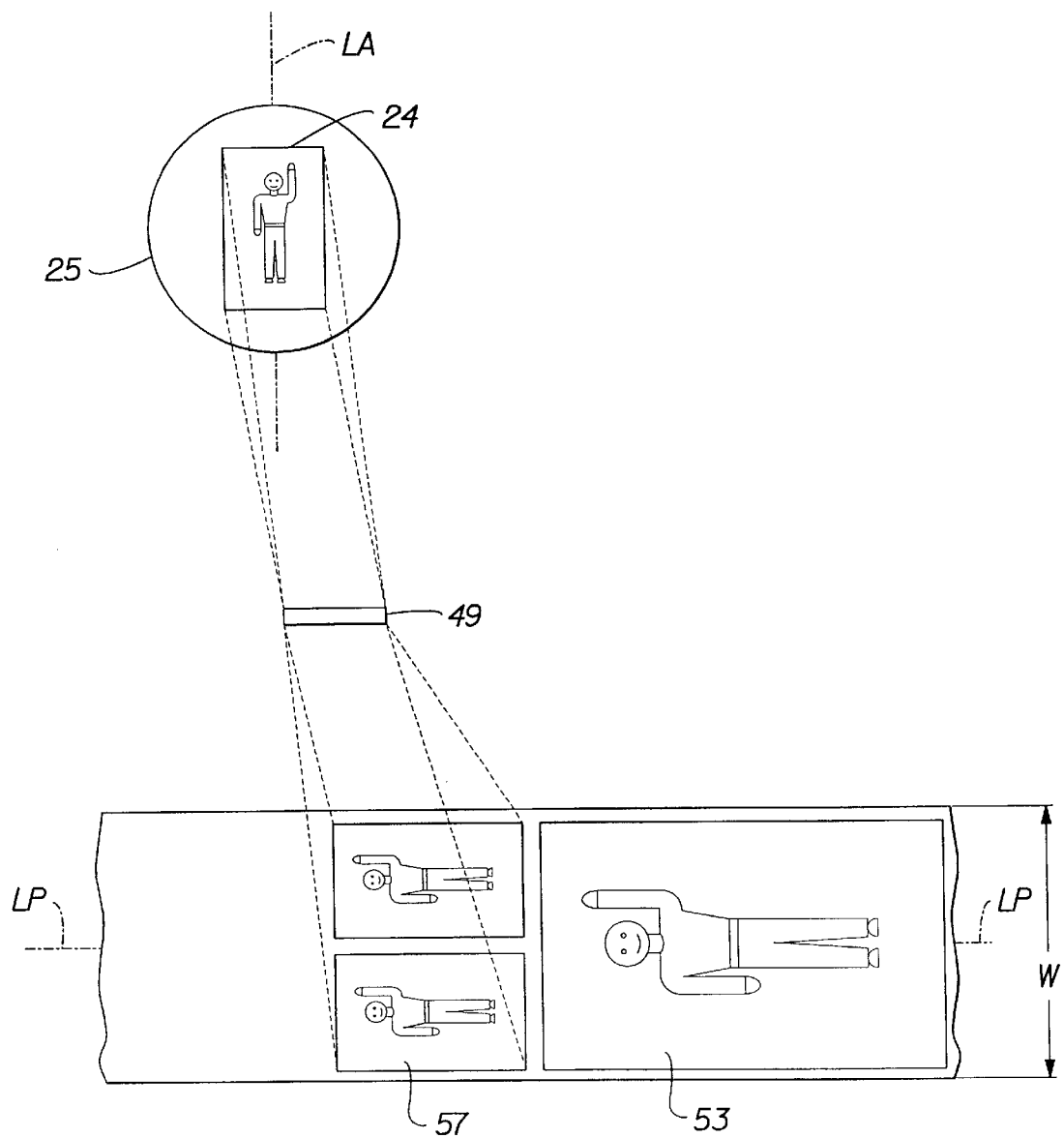
FIG. 4D is a view similar to FIG. 4B illustrating different sizes bonus prints being exposed on the photosensitive material.

The AMLCD 24 is mounted to a moveable mounting member 25 for positioning the AMLCD 24 between a first position, as illustrated in FIG. 3A, and a second position, as illustrated in FIG. 4A. When the AMLCD 24 is in the first position, standard size service prints and/or index prints may be produced, such as illustrated by service print 53 and index print 55 illustrated in FIG. 3B. The prints 53,55 substantially fill up the width W of the photosensitive material 26 and are disposed adjacent to each other. When it is desired to provide a bonus print 57, such as illustrated in FIG. 4B, the mounting member 25, which in the particular embodiment illustrated is a rotating wheel, is moved so that the AMLCD 24 is positioned as illustrated in FIG. 4A. In the embodiment illustrated, a motor (not shown) controlled by computer 22 is used to rotate mounting member 25 to the desired position as required for the desired size print. It is to be understood that mounting member 25 may be moved between the two positions by any desired technique. At the same time, zoom lens 49 is moved to a second position to adjust for the difference in size of the image to be produced. As illustrated in FIG. 4B, bonus print 57 is substantially smaller than the service print 53. Since the longitudinal axis LA of the AMLCD 24 is now positioned substantially perpendicular to the width (longitudinal axis LP) of the of photosensitive material 26, as opposed to being substantially parallel to axis LP of FIG. 3A, the size of the image being exposed by the AMLCD is smaller. As a result of this decrease in overall size, the resolution of the image of the bonus print formed is increased. For example, in the image of bonus print 57 illustrated in FIG. 4B, the image will have a resolution of 200 pixels/inch as opposed to a resolution of approximately 133 pixels/inch for the image of print 53 illustrated in FIG. 3B. As shown in FIG. 4B, the bonus print 57 is disposed directly adjacent the standard size service prints 53 for that image. The standard size service prints 53 and index prints 55 are made when the AMLCD 24 is placed in the first position as illustrated in FIGS. 3A and 3B. Whereas the bonus prints are made when the AMLCD is placed in the second position as illustrated in FIGS. 4A and 4B. As previously discussed, the bonus prints may be made directly adjacent the standard size print of the same image or made at the end of the order. Additionally any desired number of prints may be made by AMLCD in either of the positions. Referring to FIG. 4D, there is illustrated the providing of two smaller bonus prints 57.

It is, of course, understood that any type image or text, stored in the computer or supplied, may be disposed adjacent any one or all of the service prints. For example, as illustrated in FIG. 4C, text may be placed adjacent the standard size service prints 53. In the embodiment illustrated, a greeting card may formed. Since the images are stored in digital form in the computer, any desired number and combinations of images may be produced.

In order to more clearly understand the present invention, a brief description of operation of the apparatus 10 will now be discussed. When the AMLCD 24 is placed in the first position, such as illustrated in FIG. 3A, index prints and service prints of a first aspect ratio and size may be provided on the web of photosensitive material whereby the entire width W of the photosensitive material is fully utilized. When it is desired to produce bonus prints, greeting card information, or produce prints of a second smaller size and/or aspect ratio, such as illustrated in FIGS. 4B, 4C or 4D, on the. photosensitive paper 26, the mounting member 51 is rotated to the second position and zoom lens 49 is adjusted to compensate for the second image size. One, two, or any desired number of images may be made at this second position. As can be seen, no mask or adjustment other than moving of the AMLCD 24 and adjusting of the lens is required. Appropriate image data is sent to the AMLCD 24 for providing of the appropriate image, images and/or text.

When the AMLCD is rotated to the second position, a second size image can be formed, either producing images and/or text which can be placed adjacent the service prints, produced by the AMLCD 24 or by service prints made by typical optical printing methods, in which case, appropriate means are provided for advancing of paper 26 a sufficient distance for printing of the print at the appropriate location as illustrated. An example of such mechanism is described in greater detail in U.S. Pat. No. 5,652,661 issued Jul. 29, 1997, HIGH SPEED PHOTOGRAPHIC PRINTER USING OPTICAL AND DIGITAL PRINTING WITH AN ACTIVE MATRIX LCD which is hereby incorporated by reference. By quickly moving the AMLCD between the first and second positions and appropriately adjusting the zoom lens 49, various different combinations of size images may be provided by themselves, or in combination with other prints, thereby providing great versatility to the photofinisher for customizing orders in a quick and efficient manner.

While the present invention can be used with a single stand alone printer for producing both the service prints and the specialty prints described herein, the present invention may be utilized in combination with a standard optical printer such as is described in U.S. Pat. No. 5,652,661, previously referred to herein. The active matrix liquid crystal 24 can be used to provide text (such as greeting information) adjacent the service print, such as illustrated in FIG. 4C and bonus prints as illustrated in FIG. 4B, or index prints as shown in FIG. 3B.

Figure 5:
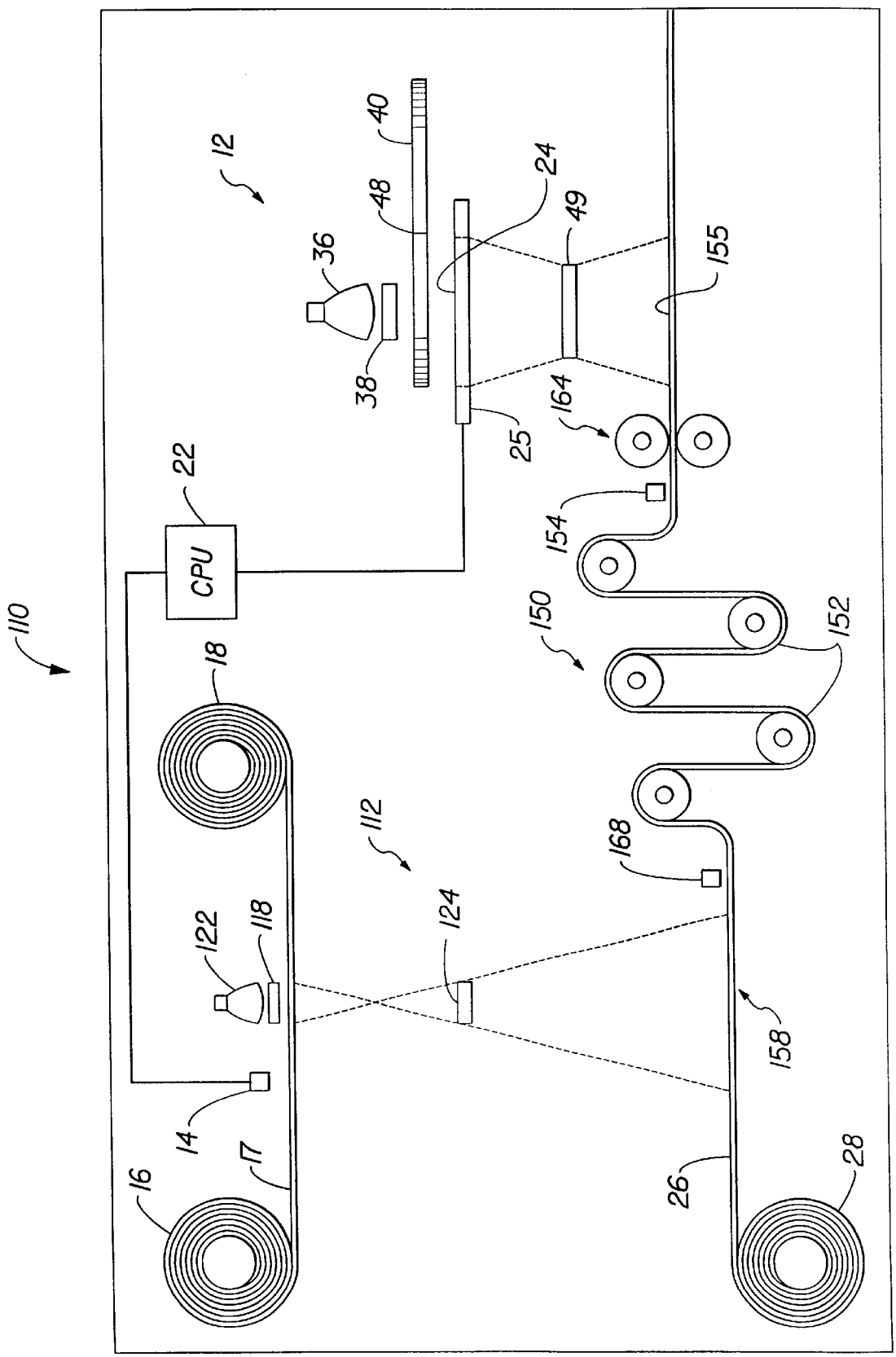
FIG. 5 is diagrammatic representation of a modified printing apparatus made in accordance with the present invention.

Referring to FIG. 5, there is illustrated a printer 110 made in accordance with the present invention, like numerals indicating like parts, as previously described. The digital printing system 12 is incorporated with an optical printing system. The optical printing system 112 includes a print gate 118 and light source 122 for exposing images from the photographic film on to paper 26. Lens 124 is provided for focusing of the image onto the paper 26 at print area 158. Since optical printing can be accomplished somewhat faster than printing by display 24, a take up mechanism 150 is provided so that the paper 26 may be stopped for the appropriate time period for printing by display 24 at printing area 155. Once printing has taken place by display 24, the paper can be rapidly advanced to take up the slack, thereby reducing the take-up loops 152. In this way the optical printing system can run continuously without having to wait for the digital printing system to print the image or images. If time is of no consequence, the optical printing system can simply be stopped and the take-up mechanism can be eliminated. In the embodiment illustrated a sensor 154 is provided so that the photographic paper 26 can be properly located at the printing section 155 of the digital printing system. Sensor 154 detects the perforations made by perforation device. 168. The perforations are used to identify and locate each of the images formed by the optical printing system. A drive 164 is used to move the paper 26 so that it is properly located at the digital print gate. The apparatus 110 is operated in much the same way as printer 10 except that optical prints can be combined with the digital printing.

It is to be understood that various changes and modifications may be made without departing from the scope of the present invention, the present invention being defined by the claims that follow.

Parts List

| | |
|---|---|
| 10 | apparatus |
| 12 | digital printing system |
| 14 | scanner |
| 16 | supply reel |
| 17 | continuous web |
| 18 | take-up reel |
| 22 | CPU |
| 24 | AMLCD |
| 25 | movable member |
| 26 | photographic paper |
| 28 | reel |
| 29 | print gate |
| 36 | light source |
| 38 | infrared cutoff filter |
| 40 | color filter wheel |
| 42, 44, 46 | filter sections |
| 48 | axis |
| 47 | opaque section |
| 49 | zoom lens |
| 53 | service print |
| 55 | index print |
| 57 | bonus print |
| 110 | printer |
| 118 | print gate |
| 122 | light source |
| 124 | lens |
| 150 | take-up mechanism |
| 152 | take-up loops |
| 154 | sensor |
| 155, 158 | print area |
| 164 | drive |
| 168 | perforation device |

What is claimed is:

1. An apparatus for printing images onto a web of photosensitive media, comprising:
   a) a light source for producing an exposure light;
   b) an imaging active matrix liquid crystal display for providing images and defining a printing gate, said exposure light passing through said liquid crystal display for printing said images on said liquid crystal display onto said media;
   c) a mechanism adapted to move said web of photosensitive media past said printing gate; and d) a device for printing images of two different printing resolutions while still filling substantially the entire width of the web;

wherein:

said device for printing images of two different printing resolutions comprises a positioning arrangement adapted to position said liquid crystal display at a first position and at a second position and a magnification device for defining a first print imaging area of a first size for printing on said web of photosensitive media when said liquid crystal display is placed in said first position and for defining a second print imaging area of a second size for printing on said photosensitive media when said liquid crystal display is placed in said second position; and said positioning arrangement comprises a rotating member in which said liquid crystal display is mounted.

2. An apparatus according to claim 1, wherein said first print imaging area has longitudinal axis which is substantially parallel to a longitudinal axis of said web of media, and said second print imaging area has a longitudinal axis which is substantially perpendicular to the longitudinal axis of said web of media.

3. An apparatus according to claim 1, wherein said liquid crystal display has an image resolution of 800×600 pixels.

4. An apparatus according to claim 1, wherein said apparatus produces images having a first resolution of 133 pixels/inch on said web of media when said liquid crystal display is placed in said first position.

5. An apparatus according to claim 1, wherein said apparatus produces images having a second resolution of 200 pixels/inch on said web of media when said liquid crystal display is placed in said second position.

6. A photographic printer for printing images on a web of photosensitive media, comprising:

a) a first printing system for optically exposing images on said web of photosensitive media; and b) a second printing system for exposing images on said web of photosensitive media at selective locations adjacent images provided on said web of media by said first printing system, said second printing system comprises a liquid crystal display and having a mechanism adapted to print images of two different printing resolutions in a first position and a second position respectively, said liquid crystal display substantially filling the photosensitive material at both of said resolutions;

wherein:

said mechanism for printing images of two different resolutions comprises a positioning device for moving said liquid crystal display between first and second positions and a magnification device for adjusting the size of the imaging area to be printed from said liquid crystal display between said first and second positions; and said positioning device comprises a rotating member in which said liquid crystal display is mounted.

7. A printer according to claim 6, wherein said liquid crystal display has an image resolution of 800×600 pixels.

8. printer according to claim 6, wherein said apparatus produces images having a first resolution of 133 pixels/inch on said web of media when said liquid crystal display is placed in said first position.

9. A printer according to claim 6, wherein said apparatus produces images having a second resolution of 200 pixels/inch on said web of media when said liquid crystal display is placed in said second position.

10. A method of printing images on a web of photosensitive media using an active liquid crystal display, said web of photosensitive media having a predetermined width, the method comprising the steps of:

a) exposing a first image of a first aspect ratio and size on said web of photosensitive media using said liquid crystal display, said first size substantially filling the width of the web of photosensitive media; and b) rotating said liquid crystal display and exposing a second image of a second size on said web, said second size substantially filling the width of the web of photosensitive media.

* * * * *